United States Patent
Mehrabi et al.

(10) Patent No.: US 11,987,252 B2
(45) Date of Patent: May 21, 2024

(54) SYSTEMS AND METHODS FOR DETERMINING WHETHER A VEHICLE IS IN AN UNDERSTEER OR OVERSTEER SITUATION

(71) Applicant: GM GLOBAL TECHNOLOGY OPERATIONS LLC, Detroit, MI (US)

(72) Inventors: Naser Mehrabi, Richmond Hill (CA); Saurabh Kapoor, Markham (CA); Seyedeh Asal Nahidi, North York (CA); SeyedAlireza Kasaiezadeh Mahabadi, Novi, MI (US); James H Holbrook, Fenton, MI (US); Hualin Tan, Novi, MI (US); Bakhtiar B Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 53 days.

(21) Appl. No.: 17/447,192

(22) Filed: Sep. 8, 2021

(65) Prior Publication Data
US 2023/0079933 A1    Mar. 16, 2023

(51) Int. Cl.
*B62D 15/02* (2006.01)
*B60W 40/101* (2012.01)

(52) U.S. Cl.
CPC ......... *B60W 40/101* (2013.01); *B62D 15/021* (2013.01); *B60W 2510/207* (2013.01); *B60W 2520/263* (2013.01)

(58) Field of Classification Search
CPC ......... B60W 40/101; B60W 2510/207; B60W 2520/263; B62D 15/021

USPC .......................................................... 701/78
See application file for complete search history.

(56) References Cited

U.S. PATENT DOCUMENTS

| | | | |
|---|---|---|---|
| 7,398,145 B2 * | 7/2008 | Kato ................... | B60T 8/17551 701/80 |
| 9,260,092 B1 * | 2/2016 | Lombrozo ............. | B62D 15/02 |
| 11,318,924 B1 * | 5/2022 | Kapoor ................ | B60K 17/354 |
| 2005/0096830 A1 * | 5/2005 | Ohta ....................... | B60T 8/172 701/1 |

(Continued)

FOREIGN PATENT DOCUMENTS

| CN | 101537853 A | * 9/2009 |
|---|---|---|
| CN | 201362301 Y | * 12/2009 |

(Continued)

*Primary Examiner* — Richard A Goldman
(74) *Attorney, Agent, or Firm* — Lorenz & Kopf, LLP

(57) ABSTRACT

Systems and methods for determining whether a vehicle is in an understeer or oversteer situation. The system includes a controller circuit coupled to an IMU and an EPS, and programmed to: calculate, for a steered first axle, an axle-based pneumatic trail for using IMU measurements and EPS signals and estimate a saturation level as a function of a distance between the axle-based pneumatic trail and zero. The system estimates, for an unsteered second axle, an axle lateral force curve with respect to a slip angle of the second axle, and a saturation level as a function of when the axle lateral force curve with respect to the slip angle transitions from positive values to negative values. The saturation level of the first axle and the second axle are integrated. The system determines that the vehicle is in an understeer or oversteer situation as a function of the integrated saturation levels.

18 Claims, 5 Drawing Sheets

(56) References Cited

U.S. PATENT DOCUMENTS

| | | | | |
|---|---|---|---|---|
| 2008/0109133 A1* | 5/2008 | Bedner | ................ | B62D 6/003 |
| | | | | 701/41 |
| 2012/0296525 A1* | 11/2012 | Endo | .................... | B62D 5/0466 |
| | | | | 701/42 |
| 2015/0034407 A1* | 2/2015 | Guerster | .................. | B62D 1/12 |
| | | | | 180/402 |
| 2017/0190355 A1* | 7/2017 | Ghoneim | ............. | G07C 5/0841 |
| 2017/0203785 A1* | 7/2017 | Naik | .................... | B62D 5/0481 |
| 2018/0043931 A1* | 2/2018 | Gupta | .................... | B62D 11/02 |
| 2018/0141543 A1* | 5/2018 | Krosschell | ............ | B60W 10/04 |
| 2021/0197778 A1* | 7/2021 | Shi | ........................ | B60T 8/1761 |
| 2021/0221432 A1* | 7/2021 | Zhang | ................. | B60W 40/114 |
| 2023/0079933 A1* | 3/2023 | Mehrabi | ............ | B60W 40/101 |
| | | | | 701/41 |

FOREIGN PATENT DOCUMENTS

| | | | | | |
|---|---|---|---|---|---|
| CN | 107150680 | A | * | 9/2017 | .......... B60W 30/045 |
| CN | 107150680 | B | * | 3/2019 | .......... B60W 30/045 |
| CN | 110116732 | B | * | 8/2020 | .......... B60W 40/10 |
| CN | 115771518 | A | * | 3/2023 | .......... B60W 40/101 |
| DE | 102022119666 | A1 | * | 3/2023 | .......... B60W 40/101 |

\* cited by examiner

SYSTEMS AND METHODS FOR DETERMINING WHETHER A VEHICLE IS IN AN UNDERSTEER OR OVERSTEER SITUATION

TECHNICAL FIELD

The present disclosure generally relates to automated control for operations in mobile platforms, and more particularly relates to systems and methods for determining whether a vehicle with a first axle and a second axle is in an understeer or oversteer situation.

As automated control of vehicle operations evolves, various control aspects present technical problems to improve upon or solve. One such technical problem is a tendency to get into an oversteer or understeer situation. An oversteer or understeer situation causes an objectively uncomfortable passenger experience and can increase wear and tear on a vehicle.

The following disclosure provides a technological solution to these technical problems, in addition to addressing related issues. Furthermore, other desirable features and characteristics of the system and method will become apparent from the subsequent detailed description and the appended claims, taken in conjunction with the accompanying drawings and the preceding background.

SUMMARY

An embodiment of processor-based method for determining whether a vehicle with a first axle and a second axle is in an understeer or oversteer situation is provided. The method includes: receiving, from an inertial measurement unit (IMU), IMU measurements for the vehicle, the IMU measurements comprising a lateral acceleration and a yaw rate; receiving a longitudinal speed; receiving, from an electric power-steering system (EPS), EPS signals comprising a steering angle, steering angular velocity, and a torque measurement; determining that the first axle is steered by the EPS, and the second axle is not steered by the EPS; calculating, for the first axle, an axle-based pneumatic trail for the first axle using the IMU measurements, longitudinal speed, and EPS signals; estimating a saturation level of the first axle as a function of a distance between the axle-based pneumatic trail and zero; estimating an axle lateral force curve with respect to a slip angle of the second axle, as a function of the IMU measurements; and estimating a saturation level of the second axle as a function of when the axle lateral force curve with respect to the slip angle of the second axle crosses zero, transitioning from positive values to negative values; integrating the saturation level of the first axle and the saturation level of the second axle; and determining that the vehicle is in an understeer or oversteer situation as a function of the integrated saturation levels, and an understeering angle estimation.

In an embodiment, further comprising: estimating an understeering angle for the vehicle; and normalizing the slip angle of the second axle as a function of the axle-based pneumatic trail for the first axle and the estimated understeering angle for the vehicle.

In an embodiment, further comprising calculating an understeering angle for the vehicle.

In an embodiment, further comprising calculating an axle-based self-aligning moment for the first axle or the second axle, as a function of the EPS signals.

In an embodiment, further comprising calculating the axle-based self-aligning moment for the first axle or the second axle, further as a function of a suspension in the vehicle.

In an embodiment, further comprising estimating a normalized first axle slip angle as a function of a calculated normalized pneumatic trail PT; and determining that the first axle is at a maximum saturation level when a normalized first axle slip angle increases more than a predefined value.

In an embodiment, further comprising estimating the understeering angle for the vehicle that represents a difference between the first axle slip angle and the slip angle of the second axle.

In an embodiment, further comprising integrating the saturation level of the first axle and the saturation level of the second axle by using a Kalman filter.

In an embodiment, further comprising generating commands for actuators in a drive system of the vehicle as a function of the understeer or oversteer situation.

In an embodiment, further comprising combining the integrated saturation level of the first axle and second axle with a sensed vehicle response to steering commands from the EPS to determine whether the vehicle is in a terminal-understeer or terminal-oversteer state.

In an embodiment, a system for determining whether a vehicle with a first axle and a second axle is in an understeer or oversteer situation is provided. The system including: an inertial measurement unit (IMU) configured to provide IMU measurements for the vehicle, the IMU measurements comprising a lateral acceleration and a yaw rate; an electric power-steering system (EPS) configured to provide EPS signals comprising a steering angle, steering angular velocity, and a torque measurement; and a controller circuit operationally coupled to the IMU and the EPS, the controller circuit programmed to: determine that the first axle is steered by the EPS, and the second axle is not steered by the EPS; calculate, for the first axle, an axle-based pneumatic trail for the first axle using the IMU measurements and EPS signals; estimate a saturation level of the first axle as a function of a distance between the axle-based pneumatic trail and zero; estimate an axle lateral force curve with respect to a slip angle of the second axle, as a function of the IMU measurements; and estimate a saturation level of the second axle as a function of when the axle lateral force curve with respect to the slip angle of the second axle crosses zero, transitioning from positive values to negative values; integrate the saturation level of the first axle and the saturation level of the second axle; and determine that the vehicle is in an understeer or oversteer situation as a function of the integrated saturation levels, and an understeering angle.

In an embodiment, the controller circuit is further programmed to estimate an understeering angle for the vehicle; and normalize the slip angle of the second axle as a function of the axle-based pneumatic trail for the first axle and the estimated understeering angle for the vehicle.

In an embodiment, the controller circuit is further programmed to calculate an understeering angle.

In an embodiment, the controller circuit is further programmed to calculate an axle-based self-aligning moment for the first axle or the second axle, as a function of the EPS signals.

In an embodiment, the controller circuit is further programmed to calculate the axle-based self-aligning moment for the first axle or the second axle, further as a function of a suspension in the vehicle.

In an embodiment, wherein the controller circuit is further programmed to:

estimate a normalized first axle slip angle as a function of a calculated normalized pneumatic trail PT; and determine that the first axle is at a maximum saturation level when a normalized first axle slip angle increases more than a predefined value.

In an embodiment, the controller circuit is further programmed to estimate the understeering angle for the vehicle representing a difference between the first axle slip angle and the slip angle of the second axle.

In an embodiment, the controller circuit is further programmed to integrate the saturation level of the first axle and the saturation level of the second axle by using a Kalman filter.

In an embodiment, the controller circuit is further programmed to generate commands for actuators in a drive system of the vehicle as a function of the understeer or oversteer situation.

In an embodiment, the controller circuit is further programmed to combine the integrated saturation level of the first axle and second axle with a sensed vehicle response to steering commands from the EPS to determine whether the vehicle is in a terminal-understeer or terminal-oversteer state.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

As used herein, the term "module" may refer to any hardware, software, firmware, electronic control component, processing logic, and/or processor device, individually or in any combination. In various embodiments, a module is one or more of: an application specific integrated circuit (ASIC), a field-programmable gate-array (FPGA), an electronic circuit, a computer system comprising a processor (shared, dedicated, or group) and memory that executes one or more software or firmware programs, a combinational logic circuit, and/or other suitable components that provide the functionality attributed to the module.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Exemplary embodiments provide a technological solution to the problem of vehicle oversteer or understeer situations. An oversteer or understeer situation causes an objectively uncomfortable passenger experience and can increase wear and tear on a vehicle.

Provided embodiments implement an algorithm that estimates an axle saturation level for steered and unsteered (also referred to as non-steered) axles and uses the estimations to determine oversteer and understeer scenarios. The output from the systems and methods can be used by central platform controllers and drive systems to anticipate and smooth out the vehicle response, thus providing an objectively improved passenger experience.

Figure 1:
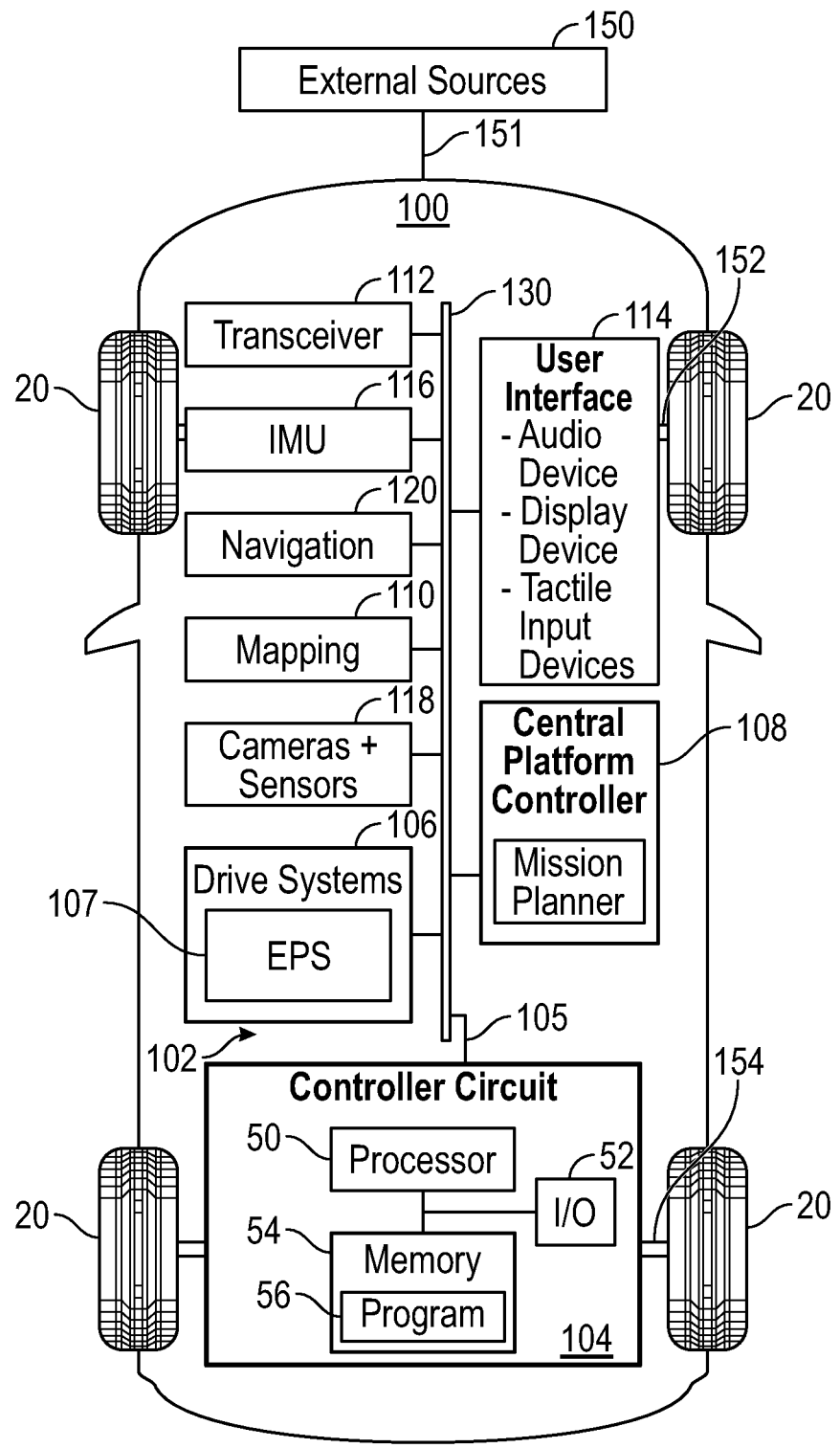
FIG. 1 is a schematic diagram illustrating a system for determining whether a vehicle with a first axle and a second axle is in an understeer or oversteer situation implemented onboard a vehicle, in accordance with various embodiments.

FIG. 1 is a functional block diagram depicting an example mobile platform. The example mobile platform is a vehicle 100 that is capable of movement, towing and carrying passengers from one location to another. The vehicle 100 is depicted in the illustrated embodiment as a passenger car, but other vehicle types, including motorcycles, taxi cabs, vehicle fleets, buses, sedans, wagons, trucks, sport utility vehicles, other automobiles, recreational vehicles (RVs), locomotives, and other vehicles may also be used. As is generally understood, the vehicle 100 may embody a body, chassis, and wheels 20, each of which are rotationally coupled to the chassis near a respective corner of the body. The vehicle 100 is depicted with four wheels 20, but the number of wheels 20 may vary in other embodiments. The vehicle 100 may be autonomous or semi-autonomous. The vehicle 100 includes at least a collective functional block, drive systems 106, which generally includes known vehicle systems for vehicle operation, such as, a propulsion system, a transmission system, an electronic power steering system (EPS 107), actuators for the wheels, wheel speed sensors providing a longitudinal speed, and a brake system. The drive systems 106 may generate a variety of signals, including vehicle speed and vehicle acceleration. In various embodiments, the drive systems 106 are operationally coupled to one or more onboard components and systems via a communication bus 130.

External sources 150 includes one or more other mobile platforms (also referred to herein as "road actors") that are external to the vehicle 100, in the environment surrounding the vehicle 100. A system for determining whether a vehicle 100 is in an understeer or oversteer situation, wherein the vehicle has a first axle and a second axle, shown generally as system 102, includes a Controller circuit 104 programmed or configured to act as a saturation determiner, as described herein. In various embodiments, the Controller circuit 104 is communicatively coupled to onboard systems and components via the communication bus 130 as illustrated by connection 105. The Controller circuit 104 may transmit commands and controls for the various onboard systems and components via connection 105 and the communication bus 130. The Controller circuit 104 may obtain information from and about various road actors via onboard camera system 118 and sensors, and/or via a transceiver 112.

Returning to the vehicle 100, the vehicle 100 may include one or more other components and/or onboard systems that may each communicate with the Controller circuit 104, generally via the communication bus 130. Non-limiting examples of the onboard components include the drive systems 106, a central platform controller 108, user interface 114, the transceiver 112, an inertial measurement unit (IMU) 116, the camera system 118 and sensors, a mapping system 110, and a navigation system 120. The functions and operations of each of these components are described in more detail below.

In various embodiments, the central platform controller 108 may receive and integrate communications from a variety of modules and systems known to be present in the above-described vehicle 100. Accordingly, in some embodiments, the inputs provided by the central platform controller 108 to the Controller circuit 104 may include or represent user inputs (including steering, braking, and velocity requests), mobile applications and systems inputs, inputs from off-board communications (e.g., via the transceiver 112), and inputs that are based on the inertial measurement unit (IMU 116), navigation system 120, mapping system 110, camera system 118 and sensors, and drive systems 106.

The user interface 114 may provide any combination of touch, voice/audio, cursor, button press and gesture control for a passenger in the vehicle 100. Accordingly, the user interface 114 may include a display device and an audio device, as is known in the industry.

The transceiver 112 may be configured to enable communication between onboard components and systems and various external sources 150, such as cloud server systems. Accordingly, in various embodiments, the transceiver 112 includes the hardware and software to support one or more communication protocols for wireless communication 151 (e.g., WiFi and Bluetooth) between the Controller circuit 104 and external sources, such as routers, interne, the cloud, satellites, communication towers and ground stations.

Figure 2:
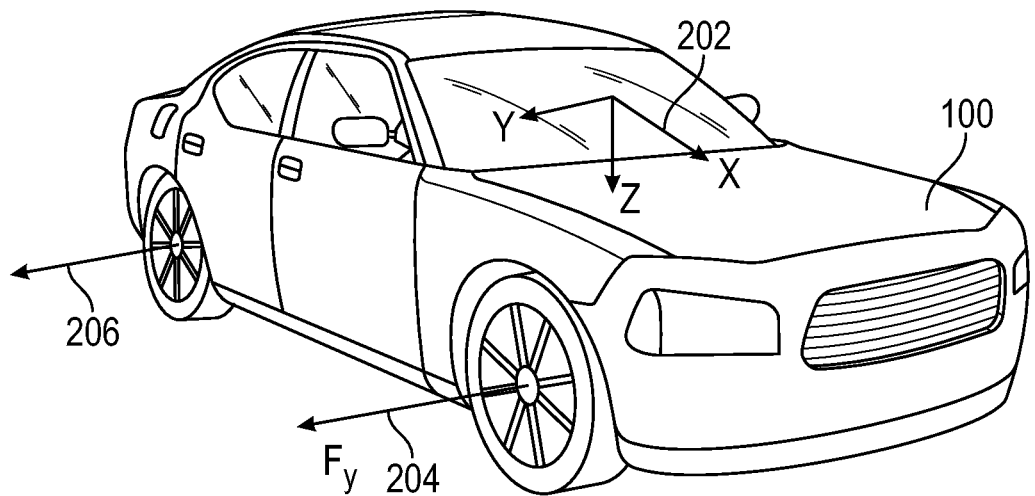
FIGS. 2-3 provide additional detail regarding two of the systems onboard the vehicle of FIG. 1.

IMU 116 is an inertial measurement unit as is known in the mobile platform industry. IMU 116 may interact via the transceiver 112 and various external sources to provide information about a location in three-dimensional space of the vehicle at any given time. IMU 116 measurements may be rooted in a cartesian coordinate system 202 placed roughly at the center of gravity of the vehicle 100, as shown in FIG. 2. Accordingly, IMU 116 measurements may include a forward/longitudinal speed (velocity) and acceleration, a lateral speed and acceleration, a yaw rate, and an elevational/altitudinal speed and acceleration for the vehicle 100. In various embodiments, the IMU 116 measurements are used to estimate an axle lateral force, Fy. In FIG. 2, a front/first axle 152 lateral force Fy 204 is noted, and a rear axle 154 lateral force Fy 206 is noted. In various embodiments, rather than front axle and rear axle, the axles 152 and 154 are referred to as first axle and second axle, or as a steered axle and an un-steered axle.

Mapping system 110 includes a database for storing up to date and high-resolution maps of streets, environmental features, and the like.

Navigation system 120 may obtain and process signals from various onboard components to make determinations about current location, trajectory, speed, acceleration, etc., as well as coordinate with the central platform controller 108, IMU 116, and mapping system 110 to plan a future location, trajectory, speed, acceleration, turns, and the like.

The camera system 118 and sensors include one or more cameras and sensors for detecting location and movement of road actors and features surrounding the vehicle. The camera system 118 may include one or more optical cameras (e.g., forward facing, 360-degree, rear-facing, side-facing, stereo, etc.), thermal (e.g., infrared) cameras, and the like, mounted on the vehicle, and capable of zooming in and zooming out. The camera system 118 may include or be part of a front collision module (FCM), augmented reality camera (ARC), or the like. In operation, the camera in the camera system 118 and sensors senses light levels, luminance, edges, contrast, saturation of light, etc., and converts the sensed information into data which it may place on the communication bus 130. In an embodiment, the camera system 118 includes object recognition software. The sensors in the camera system 118 and sensors may be configured to transmit, receive, and process lidar, radar, or other signals to assist in determinations about locations and movement of nearby road actors.

In various embodiments, as shown in FIG. 1, the Controller circuit 104 is realized as an enhanced computer system, comprising computer readable storage device or media, memory 54, for storage of instructions, algorithms, and/or programs, such as vehicle-target localization algorithm and a plurality of preprogrammed thresholds and parameters, the processor 50 to execute the program 56, and input/output interface (I/O) 52. The computer readable storage device or media, memory 54, may include volatile and nonvolatile storage in read-only memory (ROM), random-access memory (RAM), and keep-alive memory (KAM), for example. KAM is a persistent or non-volatile memory that may be used to store various operating variables while the processor 50 is powered down. The memory 54 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 50 in controlling the vehicle 100. In various embodiments, processor 50 is configured to implement the system 102. The memory 54 may also be utilized by the processor 50 to cache data, to temporarily store results of comparisons and analyses, and the like. Information in the memory 54 may be organized and/or imported from an external source during an initialization or installment operation in a method; it may also be programmed via a user I/O interface.

The input/output interface (I/O) 52 may be operationally coupled to the processor 50 via a bus and enables intra-circuit 104 communication as well as extra-circuit 104 communication. The input/output interface (I/O) 52 may include one or more wired and/or wireless network interfaces and can be implemented using any suitable method and apparatus. In various embodiments, the input/output interface (I/O) 52 includes the hardware and software to support one or more communication protocols for wireless communication between the processor 50 and external sources, such as satellites, the cloud, communication towers and ground stations. In various embodiments, the input/output interface (I/O) 52 supports communication with technicians, and/or one or more storage interfaces for direct connection to storage apparatuses.

During operation of the system 102, the processor 50 loads and executes one or more algorithms, instructions, and rules embodied as program 56, and, as such, controls the general operation of the system 102. During operation of the system 102, the processor 50 may receive data from the communication bus 130 or external sources 150. In various embodiments of the system 102, the Controller circuit 104 may: perform operations attributed to the system 102 in accordance with an algorithm; perform operations in accordance with state machine logic; and perform operations in accordance with logic in a programmable logic array.

While the exemplary embodiment of the system 102 is described in the context of the Controller circuit 104 implemented as a fully functioning enhanced computer system, those skilled in the art will recognize that the mechanisms of the present disclosure are capable of being distributed as a program product including program 56 and predefined parameters. Such a program product may comprise an arrangement of instructions organized as multiple interdependent program code modules, each configured to achieve a separate process and/or perform a separate algorithmic operation, arranged to manage data flow through the system 102. The program code modules may each comprise an ordered listing of executable instructions for implementing logical functions for the processes performed by the system 102. The instructions in the program code modules, when executed by a processor (e.g., processor 50), cause the processor to receive and process signals, and perform logic, calculations, methods and/or algorithms as described herein for automatically and in real-time performing vehicle-target localization and generating associated commands.

Once developed, the program code modules constituting a program product may be stored and distributed individually, or together, using one or more types of non-transitory computer-readable signal bearing media may be used to store and distribute the instructions, such as a non-transitory computer readable medium. Such a program product may take a variety of forms, and the present disclosure applies equally regardless of the type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized as memory and as program product time-based viewing of clearance requests in certain embodiments.

Figure 3:
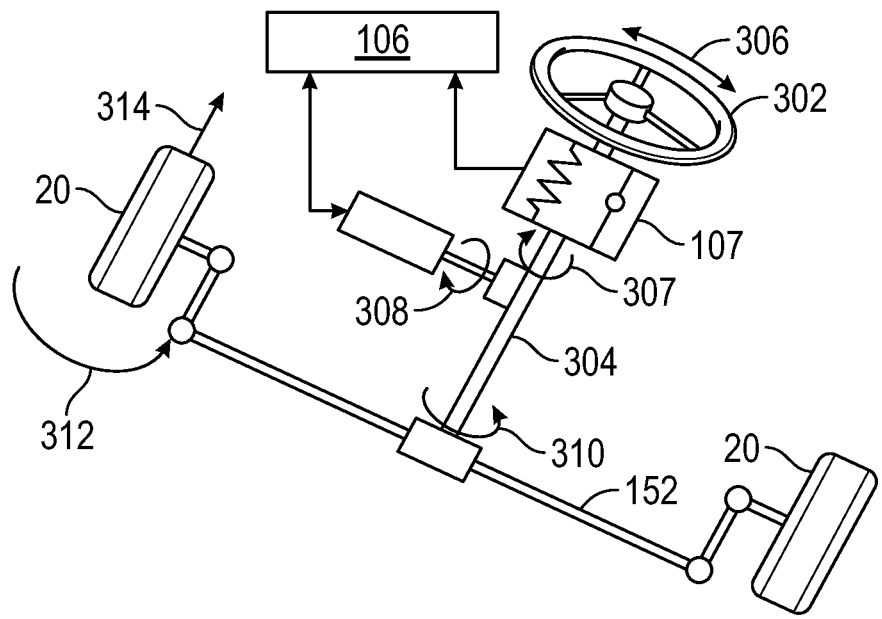

Turning to FIG. 3, and with continued reference to FIGS. 1-2, FIG. 3 provides detail showing steering-related signals and measurements related to a steered axle 152 as may be provided to and/or sensed by the EPS 107. Steering wheel 302 is in mechanical communication with a torsion bar 304. The system 102 is capable of determining whether an axle is steered or not steered. For steered axles, a manually provided torque, steering angle, and steering angle velocity 306 may be sensed by block 318 and translated by EPS 107 to an applied torque 307 to turn the steered axle 152. Concurrently, the drive system 106 may be commanding speed and acceleration 308. Applied torque 310 is responsive to the EPS 107 and drive system 106 commands. The wheels 20 (as a function of the respective tires) may respond to the applied torque 310 with a trajectory 314 that embodies a combination of measurements 312.

Figure 4:
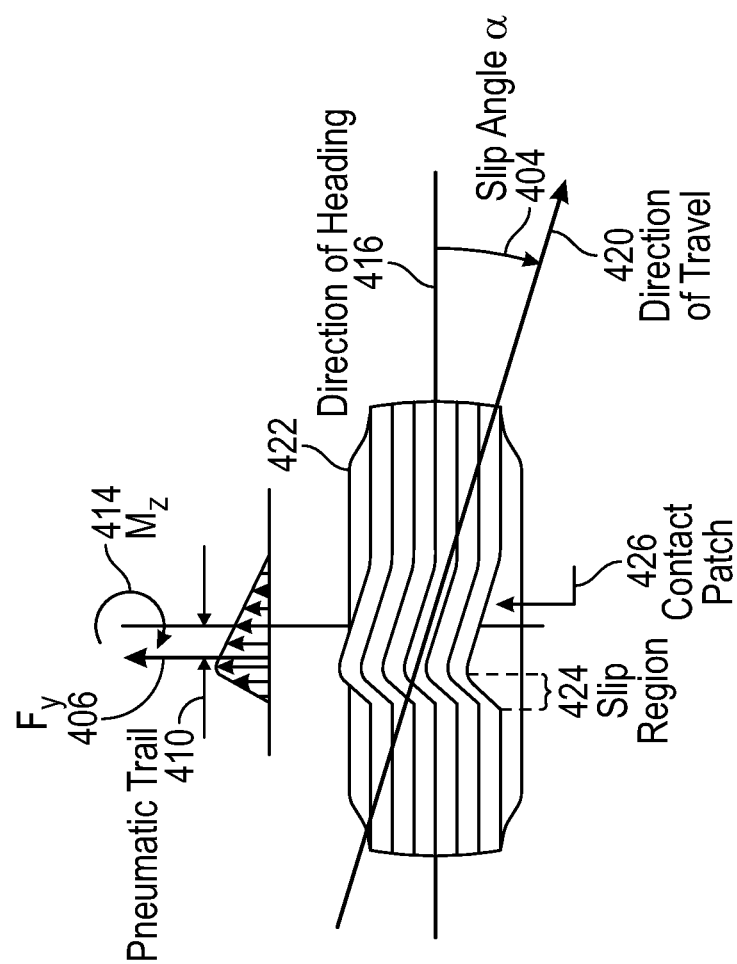
FIGS. 4-6 are used to illustrate determinations made by various embodiments of the system of FIG. 1.
Figure 4:
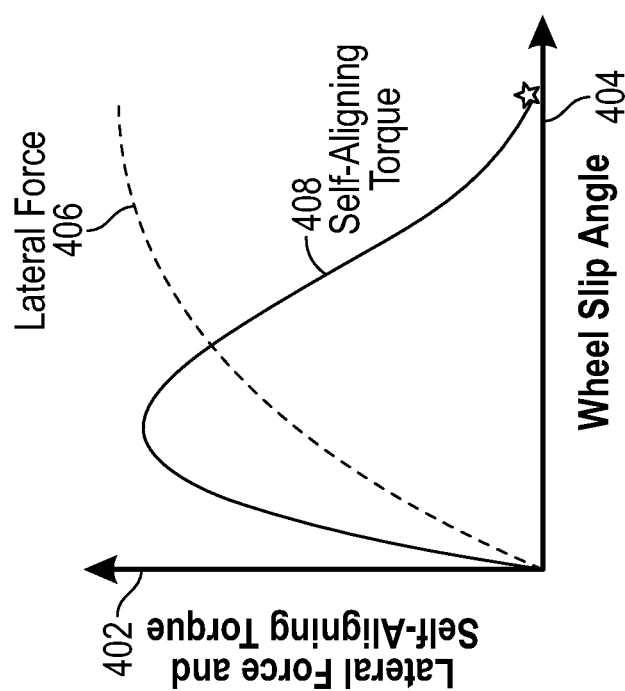

To illustrate terms used herein, FIG. 4 provides an example for a wheel 20 on an axle 152, the wheel 20 being in contact with a driving surface. The vehicle 100 is in operation, and responsive to a driving situation, the following measurements for a tire 422 on wheel 20 are illustrated: a slip region 424 of the tire 422, and a contact patch 426. In addition, the combination of measurements 312 mentioned above are depicted for the tire 422; they include a direction of heading 416, a slip angle (alpha) 404, and a direction of travel 420. In a graph on the left, an axle lateral force Fy 406 and self-aligning torque 408 are graphed on a Y axis 402 as a measure of wheel slip angle alpha 404. It can be seen that axle lateral force Fy 406 is at its maximum (i.e., maximum saturation) when the self-aligning torque 408 is at its minimum.

In another graph above the tire illustration, axle lateral force Fy is graphed on a Y axis and tire surface is graphed on an X axis. A recursive least squares method with a forgetting factor is used to calculate the axle-based pneumatic trail ($\hat{t}_p$) 410 that is graphed showing a resultant axle lateral force Fy 406, at which location the tire grabs the driving surface, the contact patch 426 starts, and a self-aligning moment ($M_z$) 414, occurring along the contact patch 426.

Responsive to the measurements 312, the system 102 may calculate an axle-based self-aligning moment ($M_z$) 414 for a given axle. The system 102 may first calculate a mechanical trail, $t_m(\delta)$, which is function of a suspension in the vehicle 100 and the EPS 107. Where $\delta$ is a road wheel angle, a total trail $\Gamma_f$, incorporated into the self-aligning moment ($M_z$) 414, includes the mechanical trail and the pneumatic trail $\hat{t}_p$, as shown in Equation 1

$$M_z = \hat{F}_y * \underbrace{(t_m(\delta) + \hat{t}_p)}_{\Gamma_f}. \qquad \text{Eq. 1}$$

Summarizing the information provided in Eq. 1 and the FIGS. 1-4, the system 102 may estimate a saturation level of a steered axle as a function of the axle-based pneumatic trail length, wherein a zero length represents a maximum saturation and largest length represents no saturation. This determination of saturation is independent of road conditions and also works in a combined slip condition.

The system 102 may determine that vehicle 100 may have one or more un-steered axles, also referred to as axles that are not steered. To estimate a saturation level of an axle that is not steered, the system 102 may employ a first method that utilizes the slip angle (alpha, a) described above, and a lateral acceleration, a yaw rate, and a longitudinal speed In some embodiments, the lateral acceleration and yaw rate come from the IMU and the longitudinal speed comes from sensors on the wheels).

The system 102 determines a maximum saturation level. In a first embodiment, a first axle is at a maximum saturation level when a graph of the normalized saturation level transitions from positive value to negative values. In another embodiment, the system 102 estimates a normalized first axle slip angle as a function of a calculated normalized pneumatic trail PT; and determines that the first axle is at a maximum saturation level when the normalized first axle slip angle increases more than a predefined value.

Figure 5:
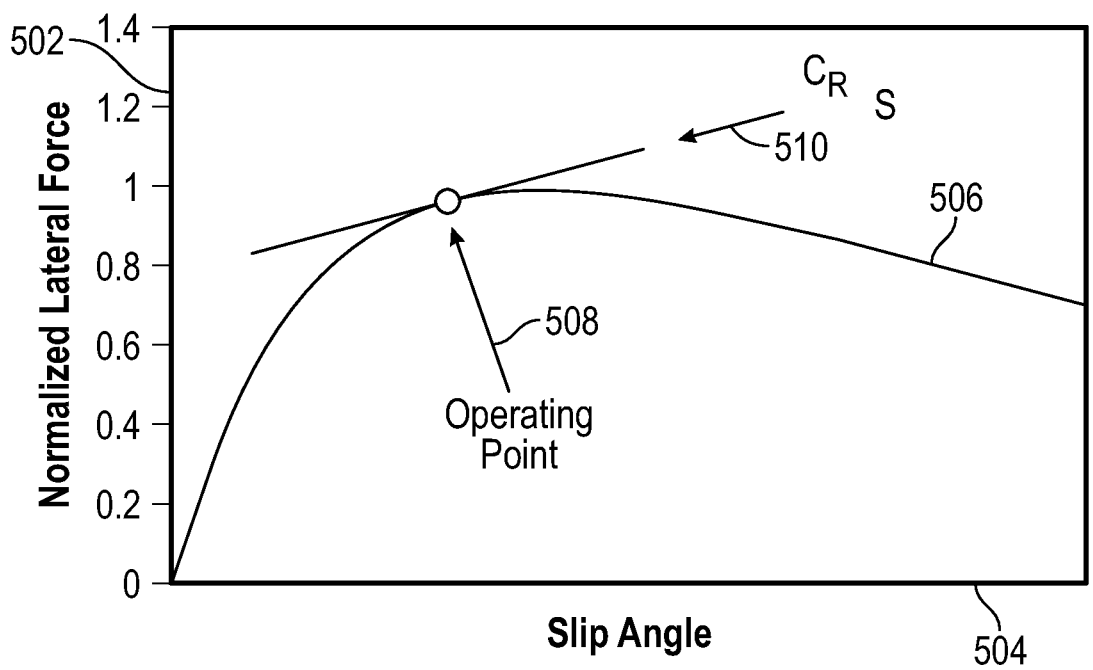

Turning to FIG. 5, an algorithm in the program 56 estimates a slope of a normalized axle lateral force Fy curve 506 (measured w.r.t. to Y axis 502, normalized axle lateral force Fy) with respect to the slip angle (alpha, α), measured along the X axis 504, as a function of the IMU 116 measurements and vehicle longitudinal speed (this slope is sometimes called "slip slope"). When the slope exhibits a sign change from positive to negative, the point 508 of this sign change represents that the axle has used all of its lateral capacity and it is saturated. This determination of saturation for an axle that is not steered is independent of road conditions and also works in a combined slip condition.

The slope estimation requires first calculating the derivatives of axle lateral force Fy and slip angle (alpha). Again, a recursive least squares method with forgetting factor may be used to estimate slip slope. In an embodiment, a bicycle model is utilized, as shown with equations 2-4, in which line 510 represent CR below.

$$\frac{d\alpha_R}{dt} = \frac{(a_y - L_r \dot{r})}{V_x} - r \qquad \text{Eq. 2}$$

$$\dot{F}_{yR} = \frac{mL_r \dot{a}_y + I_z \ddot{r}}{L_f + L_r} \qquad \text{Eq. 3}$$

$$C_R = \frac{\dot{F}_{YR}}{\dot{\alpha}_R} \qquad \text{Eq. 4}$$

Figure 6:
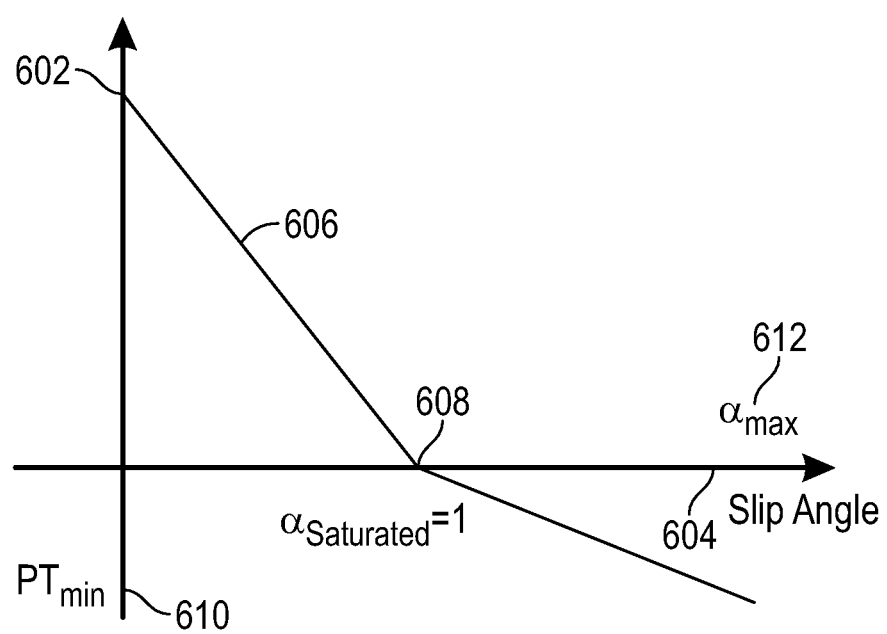

Turning to FIG. 6, in various embodiments, the system 102 may use a tire model approximation to estimate a normalized front (first axle) slip angle as a function of a calculated normalized pneumatic trail PT, such as with Equation 5. In FIG. 6, Y axis 602 is pneumatic trail and X axis 604 is slip angle.

$$\overline{\alpha_f} = \begin{cases} (1 - PT)^n & PT \geq 0 \\ \frac{PT}{PT_{min}}(1 - \alpha_{max}) + 1 & PT < 0 \end{cases} \qquad \text{Eq. 5}$$

Where (606) is the graph of equation 5, and $$\overline{\alpha_f} = \frac{\alpha_f}{\alpha_f^{sat}} \text{ and } \alpha_f^{sat}$$

(608) is slip angle at which front tires are saturated. A minimum pneumatic trail ($PT_{min}$) is depicted at 610 and a maximum slip angle ($\alpha_{max}$) 612 is depicted.

This estimation in addition to understeering angle estimation may be used to estimate a rear/second axle slip angle. In this estimation method, the understeering angle represents the different between front/first axle and rear/second axle slip angles, as shown in equation 6.

$$\delta_u = \delta - \frac{Lr}{V_x} = \alpha_f - \alpha_r \qquad \text{Eq. 6}$$

Therefore, the normalized rear slip angle is shown in equation 7.

$$\overline{\alpha}_r = \overline{\alpha}_f + \overline{\delta}_u \qquad \text{Eq. 7}$$

Where $\overline{\alpha_r} = \frac{\alpha_r}{\alpha_r^{sat}}, \overline{\delta}_u = \frac{\delta_u}{\alpha_f^{sat}}$, and $\alpha_r^{sat} = G\alpha_f^{sat}$ In equation 7, for similar front and rear tires and without load transfer, G=1.

Understeering is now described in more detail. An understeer angle ($\delta_u$) reflects a difference between front and rear axles slip angles, and therefore, their saturation levels. Large understeer angles represent terminal understeers and terminal oversteers. The algorithms in program 56 estimate vehicle level information such as an understeering angle (also sometimes shortened to understeer angle) by comparing an actual road wheel angle ($\delta$), which is part of the combination of measurements 312 and sensed by local sensors, to a desired neutral steer angle ($\delta_n$). The desired neutral steer angle $\delta_n$ is calculated and is equal to $Lr/V_x$ where L is a predefined wheelbase length for the vehicle, r is the yaw rate, and $V_x$ is longitudinal velocity. The understeer angle is a continuous signal that characterizes the vehicle response to a steering input (such as 306 in FIG. 3). By starting with equation 8, we can calculate equation 9, below.

$$\delta_u \delta - \delta_n \qquad \text{Eq. 8}$$

$$-|\alpha^*| > \delta_u * \text{sign}(\alpha_y) > |\alpha^*| \qquad \text{Eq. 9}$$

In equation 9, $\alpha^*$ is predefined in memory 54 and is calculated based on tire characteristics/data. The left side of equation 9 represents a terminal oversteer situation and the right side of equation 9 represents a terminal understeer situation.

A reader may notice that two independent sources of information and methods have been provided to estimate a saturation level of the rear or second axle: estimating a saturation level of the second axle as a function of when the axle lateral force curve with respect to the slip angle crosses zero, transitioning from positive values to negative values; and, normalizing the slip angle of the second axle as a function of the axle-based pneumatic trail for the first axle and the estimated understeering angle for the vehicle.

The system 102 may employ a Kalman filter by incorporating vehicle lateral dynamic equations, to thereby fuse the methods and integrate the saturation level of the first axle and the saturation level of the second axle, as shown in equation 10.

$$I\dot{r} = -(L_f + L_r)F_{zr}\dot{\overline{F}}_{yr} + mL_f \dot{a}_y \qquad \text{Eq. 10}$$

The corresponding Kalman filter has states of $[\dot{r} \; r \; \dot{\overline{F}}_{yr}]^T$, input of $\dot{a}_y$, and measurements of $[r \; \dot{\overline{F}}_{yr}]$. In which $\dot{\overline{F}}_{yr}$ is estimated from $\dot{\overline{F}}_{yr} = k \; \overline{\alpha}_r \; \dot{\alpha}_r$, $$\dot{\alpha}_r = \frac{(a_y - L_r \dot{r})}{V_x} - r,$$

and $\overline{a}_r$ is the normalized rear slip angle and is estimated from equation 7.

A recursive least square with forgetting factors is used to calculate the final rear axle saturation based on equation 11, which is similar to equation 4.

$$C_R = \frac{\dot{F}_{yr}}{\dot{\alpha}_r} \qquad \text{Eq. 11}$$

Using the above determinations, an understeering state interpreter module programmed in the controller circuit 104 may combine the estimated saturation levels with an understeering angle estimation (for example, using a predefined rule-based logic) to determine if the vehicle 100 is currently, or is about to go into a terminal-understeer or terminal-oversteer state.

Figure 7:
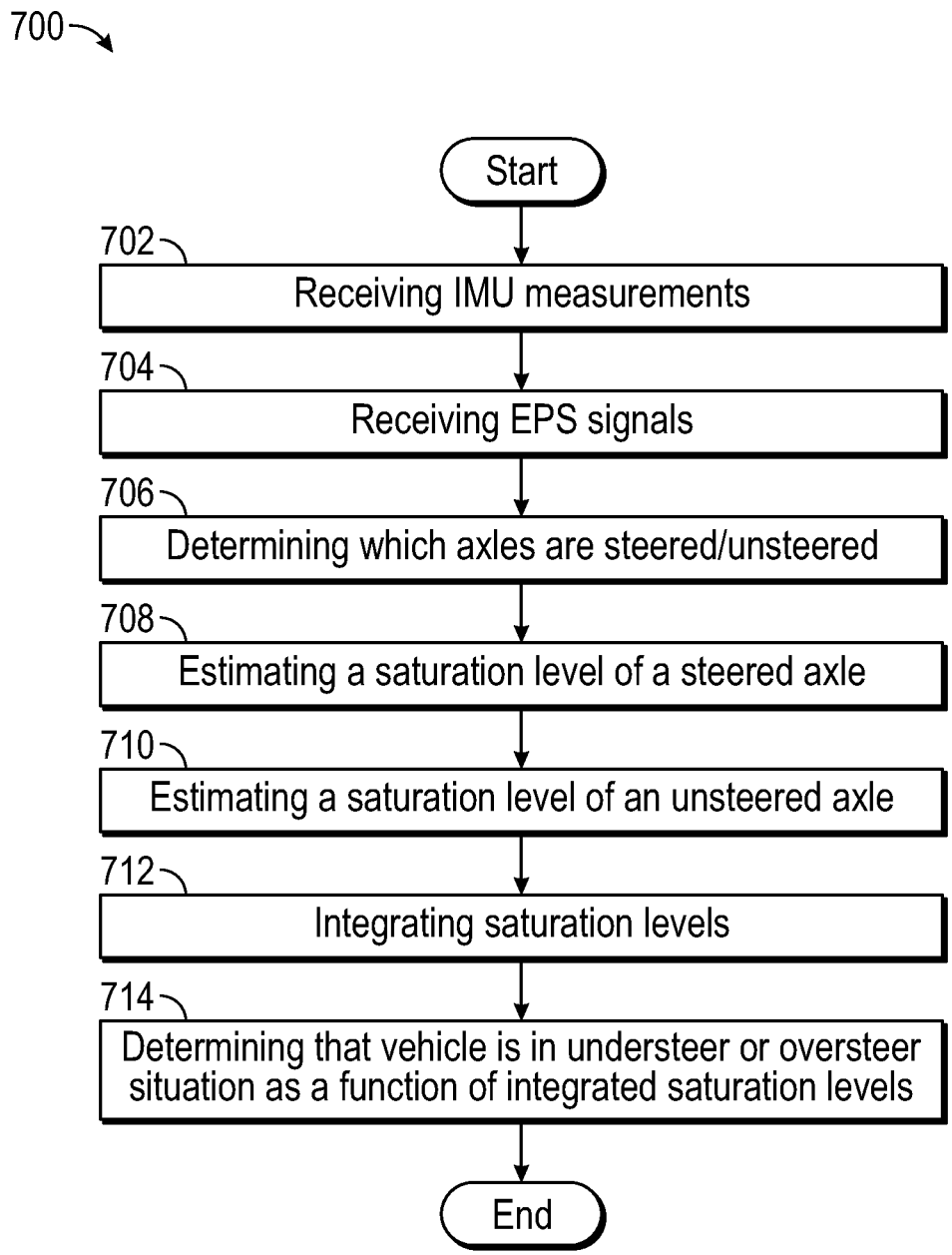
FIG. 7 provides a process flow chart depicting an example method for determining whether a vehicle with a first axle and a second axle is in an understeer or oversteer situation in accordance with various embodiments.

Turning now to FIG. 7, the following description of method 700 may refer to elements mentioned above in connection with FIGS. 1-2. In various embodiments, portions of method 700 may be performed by different components of the described system 102. It should be appreciated that method 700 may include any number of additional or alternative operations and tasks, the tasks shown in FIG. 7 need not be performed in the illustrated order, and method 700 may be incorporated into a more comprehensive procedure or method, having additional functionality not described in detail herein. Moreover, one or more of the tasks shown in FIG. 7 could be omitted from an embodiment of the method 700 if the intended overall functionality remains intact.

At 702, the system 102 is initialized and begins receiving IMU 116 measurements as the vehicle operates. At 704, the EPS 107 signals are received. Refer to the discussion in connection with FIGS. 1-3 for details on IMU measurements and EPS signals. At 706, the system 102 determines which axles are steered and unsteered. In an embodiment, a front axle is steered, and a rear axle is unsteered, but in other embodiments, this may vary. Determining which axles are steered may be hard wired into the system 102 or detected with software polling of the EPS 107. At 708 the system 102 begins performing the tasks of estimating a saturation level for the steered axle. As discussed above, this task is reliant upon first calculating, for the steered axle, an axle-based pneumatic trail using the IMU measurements and EPS signals. At 706, the estimation of the saturation level of the first axle is a function of the axle-based pneumatic trail length.

At 710, the system 102 proceeds to the tasks of estimating a saturation level for an unsteered axle. At 710, this includes calculating an axle lateral force curve with respect to a slip angle of the second axle, as a function of the IMU measurements; and estimating a saturation level of the second axle as a function of when the axle lateral force curve with respect to the slip angle of the second axle crosses zero, transitioning from positive values to negative values.

At 712, the system 102 performs the tasks of integrating the saturation levels. In various embodiments, this includes integrating the saturation level of the first axle and the saturation level of the second axle by using a Kalman filter.

At 714, the system 102 performs the tasks of determining that the vehicle is in an understeer or oversteer situation. As described above, the understeer situation and oversteer situation may each be estimated using a rule-based interpreter logic, that uses the saturation levels as well as understeering angle estimations to determine if vehicle is in or about to go in understeer-terminal, or oversteer-terminal states.

After 714, the method 700 may end, or may proceed to other steps, such as, generating commands for actuators in a drive system 106 of the vehicle 100 as a function of the understeer or oversteer situation; or, combining the integrated saturation level of the first axle and second axle with a sensed vehicle response to steering commands from the EPS to determine whether the vehicle is in a terminal-understeer or terminal-oversteer state.

Thus, the provided system 102 and method 700 provide a technological solution to the technical problems of oversteer or understeer situations that available automated driving systems and methods encounter. Provided embodiments estimate saturation levels of a front and rear axle to determine oversteer and understeer situations, which translates into an objectively improved riding experience for a passenger.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

What is claimed is:

1. A processor-implemented method for determining whether a vehicle with a first axle and a second axle is in an understeer or oversteer situation, the method comprising:
   receiving, from an inertial measurement unit (IMU), IMU measurements for the vehicle, the IMU measurements comprising a lateral acceleration and a yaw rate;
   receiving a longitudinal speed;
   receiving, from an electric power-steering system (EPS), EPS signals comprising a steering angle, steering angular velocity, and a torque measurement;
   determining, by a processor, that the first axle is steered by the EPS, and the second axle is not steered by the EPS;
   determining, by the processor, a saturation level of the first axle based on the IMU measurements and the EPS signals;
   determining, by the processor, a saturation level of the second axle based on the steering angle, the longitudinal speed, and the yaw rate;
   integrating the saturation level of the first axle and the saturation level of the second axle;
   determining, by the processor, that the vehicle is in an understeer or oversteer situation as a function of the integrated saturation levels, and an understeering angle; and
   in response to the determining that the vehicle is in an understeer or oversteer situation, generating, by the processor, control signals for actuators of a drive system to smooth a vehicle response.

2. The processor-implemented method of claim 1, wherein the determining the saturation level of the second axle is based on
   normalizing a slip angle of the second axle as a function of an axle-based pneumatic trail for the first axle and the understeering angle.

3. The processor-implemented method of claim 1, wherein the determining the saturation level of the second axle is based on an axle lateral force curve with respect to the slip angle, and wherein the saturation level is further based on when the lateral force transitions from positive values to negative values.

4. The processor-implemented method of claim 1, further comprising calculating an axle-based self-aligning moment for the first axle or the second axle, as a function of the EPS signals.

5. The processor-implemented method of claim 4, further comprising calculating the axle-based self-aligning moment for the first axle or the second axle, further as a function of a suspension in the vehicle.

6. The processor-implemented method of claim 1, further comprising:

wherein the determining the saturation level of the first axle is based on a pneumatic trail length.

7. The processor-implemented method of claim 1, further comprising estimating the understeering angle based on a difference between a slip angle of the first axle and a slip angle of the second axle.

8. The processor-implemented method of claim 1, wherein the integrating comprises integrating the saturation level of the first axle and the saturation level of the second axle by using a Kalman filter.

9. The processor-implemented method of claim 1, further comprising combining the integrated saturation level of the first axle and second axle with a sensed vehicle response to steering commands from the EPS to determine whether the vehicle is in a terminal-understeer or terminal-oversteer state, and wherein the generating the control signals is in response to the determination of the terminal-understeer or the terminal-oversteer state.

10. A system for determining whether a vehicle with a first axle and a second axle is in an understeer or oversteer situation, the system comprising:
   an inertial measurement unit (IMU) configured to provide IMU measurements for the vehicle, the IMU measurements comprising a lateral acceleration and a yaw rate;
   an electric power-steering system (EPS) configured to provide EPS signals comprising a steering angle, steering angular velocity, and a torque measurement; and
   a controller circuit operationally coupled to the IMU and the EPS, the controller circuit programmed to, by a processor:
      determine that the first axle is steered by the EPS, and the second axle is not steered by the EPS;
      determine a saturation level of the first axle based on the IMU measurements and the EPS signals;
      determine a saturation level of the second axle based on the steering angle, the longitudinal speed, and the yaw rate;
      integrate the saturation level of the first axle and the saturation level of the second axle;
      determine that the vehicle is in an understeer or oversteer situation as a function of the integrated saturation levels, and an understeering angle; and
      in response to the determining that the vehicle is in an understeer or oversteer situation, generate control signals for actuators of a drive system to smooth a vehicle response.

11. The system of claim 10, wherein the controller circuit determine the saturation level of the second axle based on normalizing the slip angle of the second axle as a function of an axle-based pneumatic trail for the first axle and the understeering angle.

12. The system of claim 10, wherein the controller circuit is further programmed to determine the saturation level of the second axle based on an axle lateral force curve with respect to slip angle, and wherein the saturation level is further based on when the lateral force transitions from positive values to negative values.

13. The system of claim 10, wherein the controller circuit is further programmed to calculate an axle-based self-aligning moment for the first axle or the second axle, as a function of the EPS signals.

14. The system of claim 13, wherein the controller circuit is further programmed to calculate the axle-based self-aligning moment for the first axle or the second axle, further as a function of a suspension in the vehicle.

15. The system of claim 10, wherein the controller circuit is further programmed to:
   determine the saturation level of the first axle based on a pneumatic trail length.

16. The system of claim 15, wherein the controller circuit is further programmed to determine the understeering angle based on a difference between a slip angle of the first axle and a slip angle of the second axle.

17. The system of claim 15, wherein the controller circuit is programmed to integrate the saturation level of the first axle and the saturation level of the second axle by using a Kalman filter.

18. The system of claim 15, wherein the controller circuit is further programmed to combine the integrated saturation level of the first axle and second axle with a sensed vehicle response to steering commands from the EPS to determine whether the vehicle is in a terminal-understeer or terminal-oversteer state, and generate the control signals further in response to the determination of the terminal-understeer or the terminal-oversteer state.

* * * * *